Feb. 2, 1937. L. D. SOUBIER 2,069,541
MACHINE FOR FORMING HOLLOW GLASS CONTAINERS
Filed Aug. 1, 1934 4 Sheets-Sheet 2

Leonard D. Soubier
INVENTOR.

BY J. F. Rule
ATTORNEY

Feb. 2, 1937.   L. D. SOUBIER   2,069,541
MACHINE FOR FORMING HOLLOW GLASS CONTAINERS
Filed Aug. 1, 1934   4 Sheets-Sheet 3
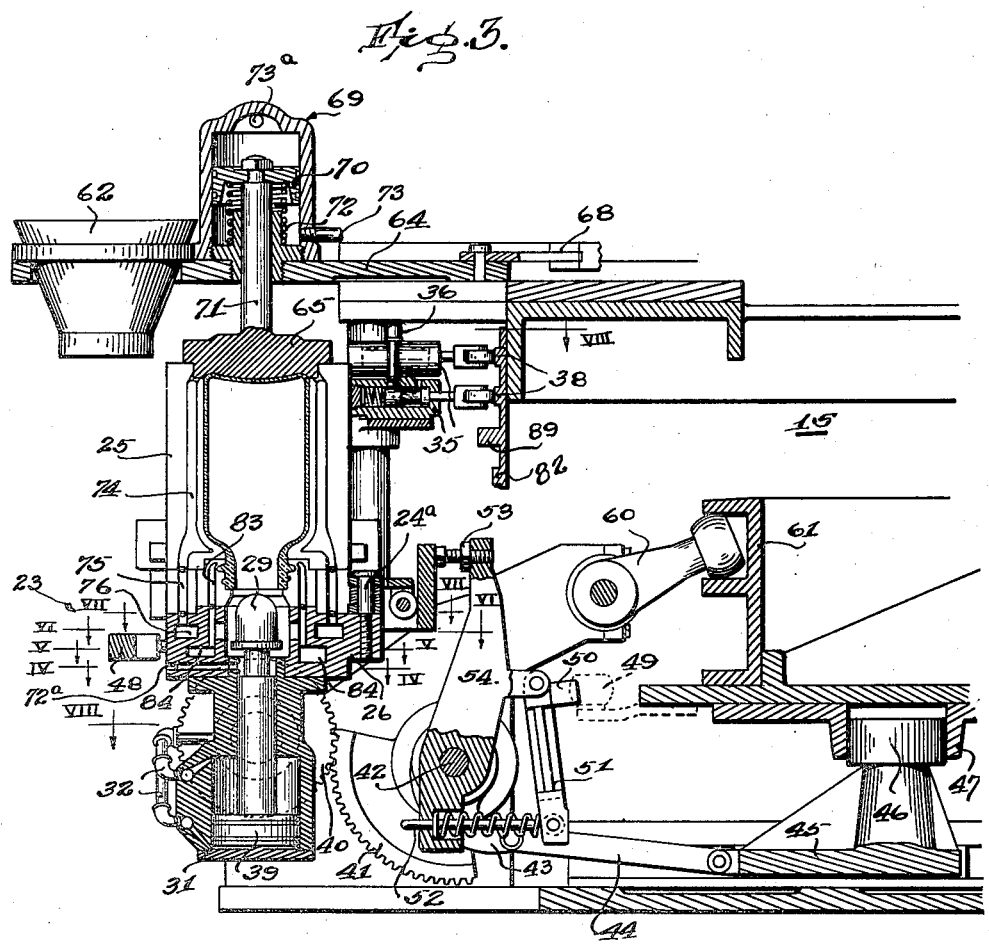
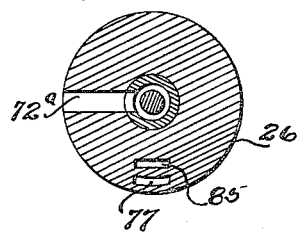
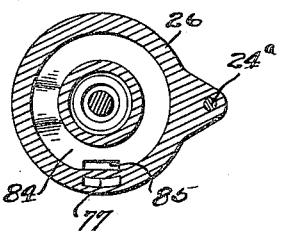
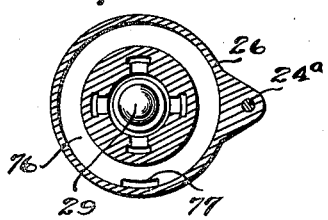
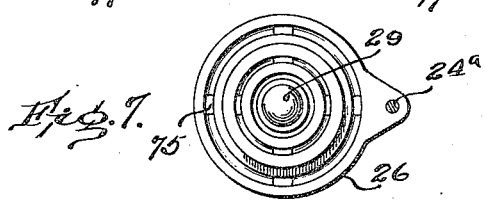

Feb. 2, 1937. L. D. SOUBIER 2,069,541
MACHINE FOR FORMING HOLLOW GLASS CONTAINERS
Filed Aug. 1, 1934  4 Sheets-Sheet 4
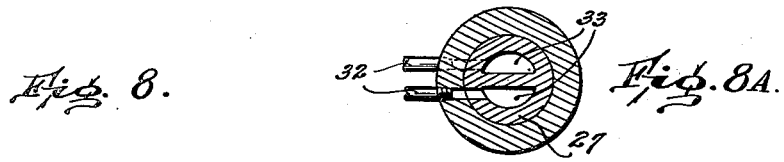
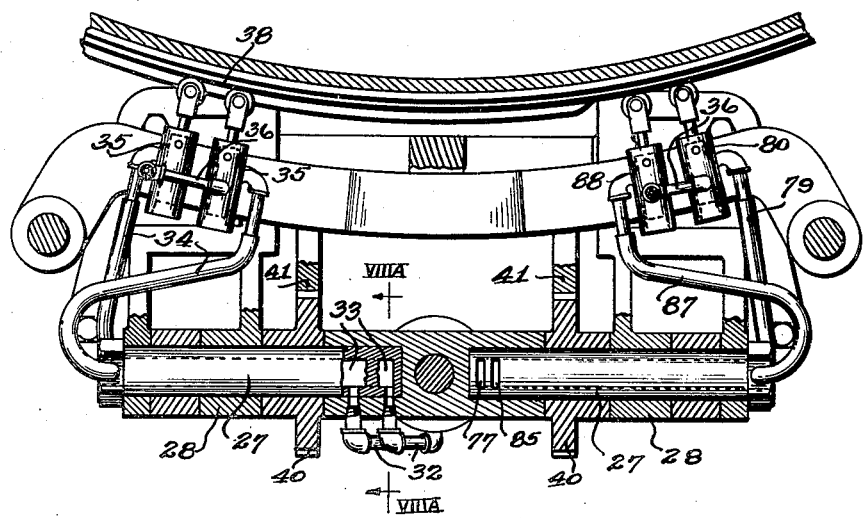
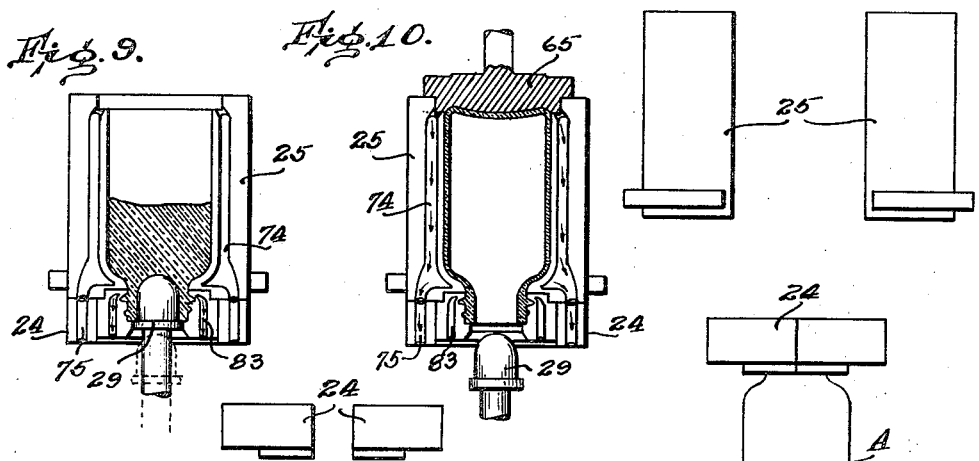
INVENTOR.
Leonard D. Soubier
BY
J. F. Rule, ATTORNEY Patented Feb. 2, 1937

2,069,541

UNITED STATES PATENT OFFICE 2,069,541

MACHINE FOR FORMING HOLLOW GLASS CONTAINERS

Leonard D. Soubier, Toledo, Ohio, assignor to Owens-Illinois Glass Company, a corporation of Ohio Application August 1, 1934, Serial No. 737,910

4 Claims. (Cl. 49—12)

The present invention relates to improvements in machines for forming hollow glass containers and more particularly to that type in which the various fabricating operations are performed automatically and without interrupting normal motion of the machine.

An object of the present invention is the provision of means whereby a hollow glass container may be completely formed in the mold to which a measured quantity of glass or mold charge, is transferred from the source of supply of glass. To this end the mold cavity is of the same contour and dimensions as the exterior surface of the containers being produced on the machine and is provided with a mold bottom plate which closes the charging opening of the mold.

Another object is the provision in an apparatus of the above character of a mold unit including body and neck molds and means for effecting application of vacuum first to the neck mold and then to the body mold in the transformation of a mold charge into a finished hollow container.

Other objects will be in part apparent and in part pointed out hereinafter.

In the accompanying drawings:

Fig. 3 is a detail vertical sectional view showing part of the mechanism illustrated in Fig. 2 and disclosing the relation between the various parts during the expanding operation.

Figure 1:
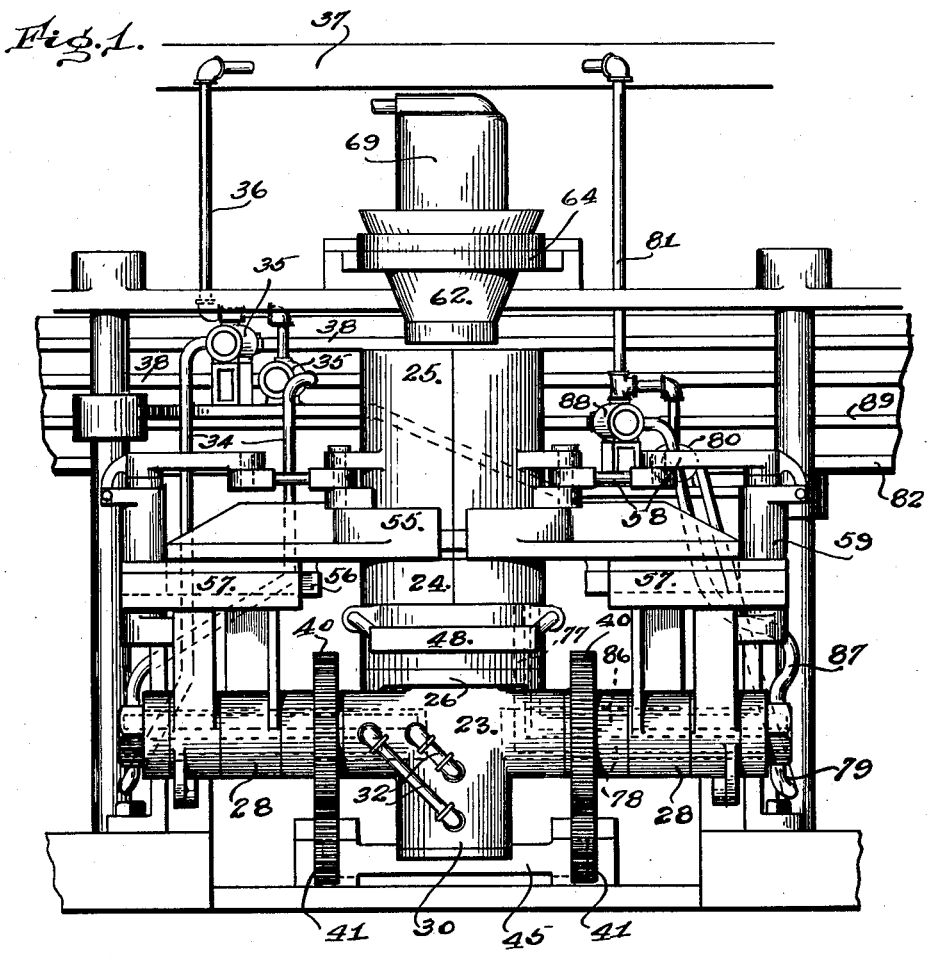
Fig. 1 is a fragmentary front elevational view of one mold group or head of the machine.

Figs. 4, 5, 6, and 7, are sectional elevational views taken along the lines IV—IV, V—V, VI—VI, and VII—VII respectively, of Fig. 3.

Fig. 8 is a sectional elevational view taken substantially along the line VIII—VIII of Fig. 3.

Fig. 8-A is a sectional view taken along the line VIII-A—VIII-A of Fig. 8.

Figs. 9, 10, 11, and 12, illustrate the cycle of operations involved in transforming a mold charge into a finished article and placing the latter upon a machine conveyor. Fig. 9 shows the mold charge immediately after it has been deposited in the mold, portions of the glass being drawn into the neck cavity by vacuum. Fig. 10 illustrates the next step in which the charging opening is closed by a bottom plate, the plunger withdrawn from the neck mold, and vacuum applied to the body mold. Fig. 11 shows the body mold open and the neck mold inverted and supporting the finished article. Fig. 12 shows the finished article resting upon the machine conveyor directly beneath the open neck mold.

The present invention is shown embodied in a flow type forming machine such as that constituting the subject matter of LaFrance Patent 1,878,863, September 20, 1932, to which patent reference may be had for details of construction which form no part of this invention and are not claimed herein.

The machine in which my invention is embodied for illustrative purposes, is of well known construction and consists of a rotary mold carriage 15 mounted upon a stationary base 16, said carriage supporting mold groups 17 or heads of which there may be an annular series as shown in the above identified LaFrance patent. Rotary movement is imparted to said carriage 15 by means of a motor (not shown) operating through a worm 18, worm gear 19, shaft 20, and pinion 21, the latter running in mesh with a ring gear 22 attached to the lower side of the mold carriage.

By such rotary movement of the mold carriage the mold groups are brought in succession to a charging station or position (not shown) where measured quantities or mold charges, of molten glass are dropped into the molds. Thereafter, in these same molds the mold charges are transformed into finished hollow containers solely through the application of vacuum. After the glass has been transformed into finished articles a portion of the molding device is inverted as a part of an operation involved in discharging the articles from the machine and placing them upright upon a conveyor.

Each mold group includes a turnover unit 23 which carries a partible neck mold 24 and partible body mold 25 which together constitute a combined primary and finishing mold, in as much as the cavity created by the two molds corresponds identically as to dimensions and contour to the exterior surface of the hollow container being produced by the machine.

The turnover unit 23 includes an invertible neck mold adapter 26 supported on the inner ends of a pair of horizontally aligned hollow shafts 27 which in turn are journaled in bearings 28. A plunger 29 carried by the turnover unit is adapted for projection into the corresponding neck mold by means of a piston motor 30 which may be vacuum operated. The motor as shown includes a cylinder 31 carried by said adapter and having its opposite ends connected by pipes 32 to one of the hollow shafts 27. As will be noted in Fig. 8, the shaft with which these pipes are connected is provided with two chambers 33 which communicate by way of pipes 34 with valves 35, said valves being connected by means of a supply pipe 36 to a vacuum chamber 37. Stationary cams 38 operate these valves in alternation so that vacuum is alternately applied to the opposite ends of the motor cylinder 31 and thereby reciprocates a piston 39 which is suitably connected to the plunger 29.

The turnover unit is adapted to be inverted and reinverted about the axis of the shafts 27 by mechanism including pinions 40 fixed to the shafts 27 and running in mesh with sector gears 41 which are carried by a horizontal shaft 42 and suitably connected through arms 43 and links 44 to a slide block 45, the latter carrying a cam roll 46 running in a stationary cam 47. This cam 47 is of such shape that it inverts and reinverts the turnover unit at proper intervals in synchronism with the various fabricating operations.

The neck mold 24 consists of two sections which are adapted for opening and closing movements about a vertical hinge pin 24ª, such opening and closing of the mold being effected as in the LaFrance patent referred to above, by means of a frame 48 carried by the neck mold adapter and operated by means including a stationary cam roll 49 (Fig. 3) which engages the cam face 50 of a bell crank lever 51 and a push rod 52 connected to the lever and operated by the latter after inversion of the neck mold to move said frame 48 radially outward and open the mold. Upon reinversion of the neck mold the frame 48 is brought into contact with a stop 53 on a bracket 54 and moved in a reverse direction, whereupon the neck mold is again closed.

The body mold 25 is made up of two separable sections adapted to be moved toward and away from each other along a line above and parallel with the axis of the shafts 27 which support the turnover unit. Each mold section is mounted upon a carrier 55 which is supported on a slide block 56, the latter being mounted in a stationary slideway 57. By means of links 58, rock shafts 59, and other devices as shown in the LaFrance patent herein referred to, the mold sections are connected to a rocker arm 60 which is actuated at regular time intervals by a stationary cam 61. Rocking of this arm 60 alternately opens and closes the corresponding body mold.

As brought out heretofore mold charges of molten glass are dropped into the molds at the charging position. A funnel guide 62, which is in register with the charging opening 63 of the corresponding mold at the charging position, assists in directing mold charges to the mold. A shiftable carrier 64 for said funnel guide is mounted upon the mold carriage for movement radially of the machine, such movement being for the purpose of placing either the funnel guide or a mold bottom plate 65 associated therewith, in register with the corresponding mold. A cam 66 operating through a cam roll 67 and lever 68 regulates and controls movement of said carrier 64. The mold bottom plate 65 is adapted to be moved vertically downward into engagement with the mold by means of a piston motor 69 mounted on said carrier 64. A piston 70 forming a part of said motor is connected by a rod 71 to said bottom plate 65. A coil spring 72 normally operates to yieldingly hold the piston and bottom plate in their uppermost positions. Vacuum may be applied to the motor 69 below the piston 70 by way of a port 73 in timed relation to lowering of the plunger so that the closure plate is seated at the time the plunger is withdrawn. A port 73ª in one end of the cylinder opens to the atmosphere for obvious reasons.

Transformation of a mold charge into a finished hollow container is effected by applying vacuum to the neck mold and thereafter, following withdrawal of the plunger 29 from the neck mold, the application of vacuum to the body mold 25. The construction providing for such application of vacuum includes opposed vacuum grooves 74 in the meeting faces of the body mold 25, said grooves communicating by way of conduits 75 in the neck mold, with an annular vacuum chamber 76 in the neck mold adapter 26. A port 77ª in the adapter 26 establishes communication between the atmosphere and neck cavity when the plunger is withdrawn. A passageway 77 connects said annular chamber with a chamber 78 in one of the shafts 27, the last named chamber being in turn connected by a pipe 79 and valve 80 to a vacuum supply pipe 81 leading to the vacuum chamber 37. A cam 82 operates the valve 80 at regular time intervals for the purpose of applying vacuum to the body mold cavity. The neck mold 24 is provided with opposed vacuum grooves 83 in its meeting face, said grooves communicating with an annular vacuum chamber 84 in the neck mold adapter. This vacuum chamber 84 is connected by a passageway 85 to a chamber 86 extending alongside of the chamber 78 in said other shaft 27. The chamber 86 in said shaft is connected by a pipe 87 to a valve 88 which in turn is connected to the vacuum supply pipe 81. A cam 89 is adapted to open the valve 88 at regular time intervals.

Figure 2:
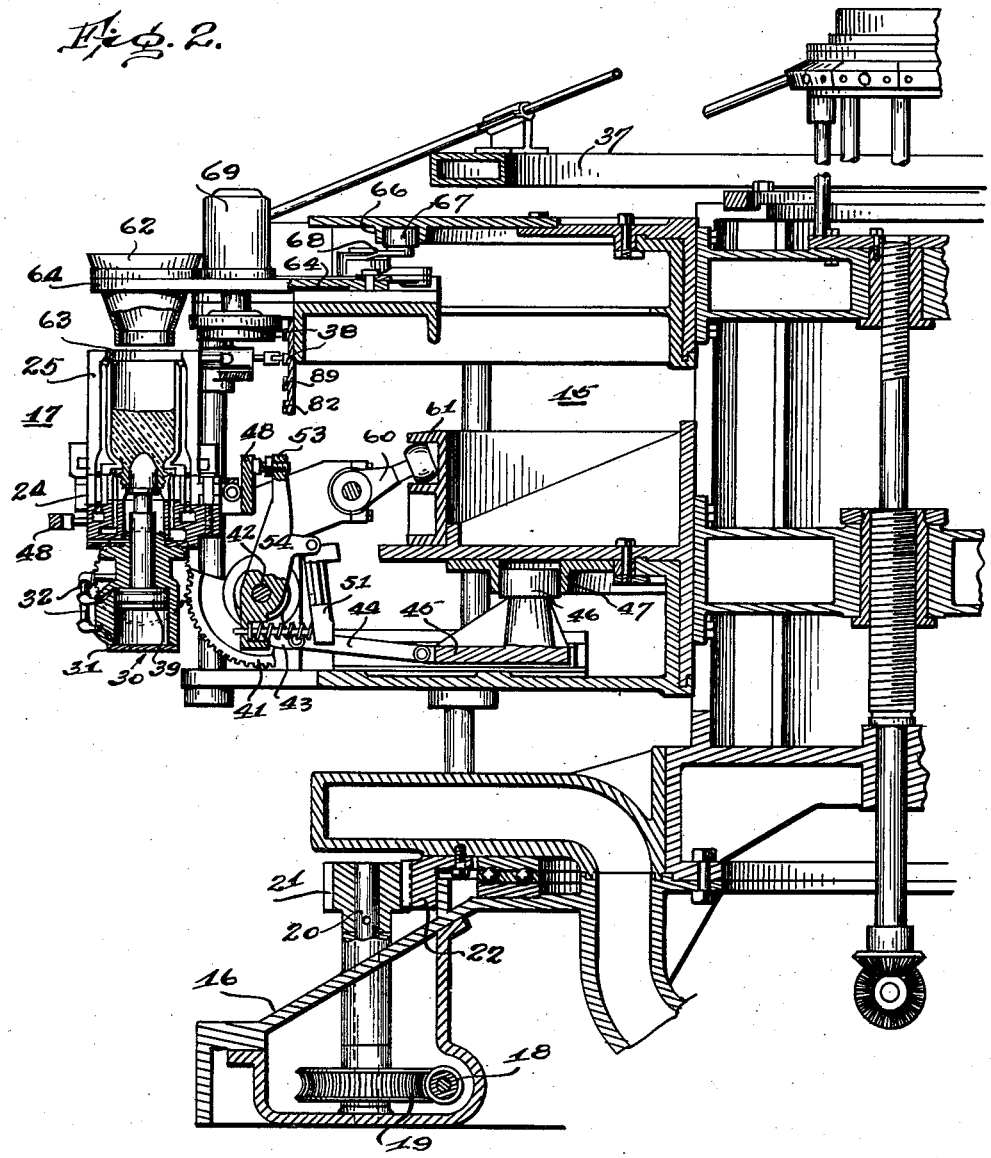
Fig. 2 is a vertical sectional view taken substantially along the plane of line II—II of Fig. 1 but showing additional mechanism above and below the limits of Fig. 1.

In operation the mold carriage is rotated continuously, thereby bringing the mold groups one at a time to a charging position. In this position the body mold opens upwardly and in register with the corresponding funnel guide 62. A measured quantity of molten glass or a mold charge delivered by an automatic feeder or the like (not shown) is dropped through the funnel guide into the mold. Prior to this charging operation the plunger 29 is projected into the neck mold (Fig. 2). Thus, upon delivery of the mold charge of molten glass to the mold the glass flows into the neck mold cavity surrounding the plunger. Such movement of the glass into this cavity and complete filling of said cavity is accelerated through the application of vacuum to the neck mold cavity by way of the vacuum grooves 83. Upon completion of the neck forming operation which is accomplished by the above described filling of the cavity about the plunger, the latter is withdrawn from the neck mold and preferably the application of vacuum to the neck mold cavity is discontinued. The mold bottom plate 65 is then brought into position to close the charging end of the body mold 25. Immediately thereafter and before the glass reaches an unworkable condition, vacuum is applied to the body mold 25 by way of the grooves 74, with the result that the differential pressure being applied to the opposite ends of the mold charge expands the glass to the form of the finished hollow container.

After the fabricating operations have been completed and the application of vacuum discontinued, the body mold 25 is opened by the mechanism heretofore described. The turnover unit is then inverted to suspend the finished article from the neck mold over a machine conveyor C. By opening the neck mold at this point the finished article A may be deposited upright upon said conveyor.

Modifications may be resorted to within the spirit and scope of the appended claims.

What I claim is:

1. In combination, a combined primary and finishing mold having a cavity corresponding identically in contour and dimensions to the exterior surface of a hollow glass container to be produced therein, said mold having an upwardly facing charging opening through which a mold charge of glass is adapted to enter said mold after separation from a supply body, a mold bottom plate adapted to close said opening after the charging operation, means for applying vacuum to a part of said cavity to thereby transform a portion of the mold charge to its final shape, and means for thereafter applying vacuum to the remaining portion of the cavity to effect expansion of the other portion of the mold charge to its final shape.

2. In a machine for producing hollow glass containers, partible body and neck molds cooperating to provide a finishing mold cavity having an upwardly facing charging opening, a mold bottom plate arranged to close said charging opening after a mold charge has been delivered to said mold, a turnover unit carrying the neck mold, a plunger carried by said unit and arranged for projection into the neck mold, means for applying vacuum to the neck mold, means for thereafter removing the plunger, means for then applying vacuum to the body mold to complete transformation of the mold charge into a finished hollow container, means for then opening the body mold, means for actuating said turnover unit to thereby invert the neck mold and finished container, means for opening the neck mold to thereby discharge the container, means for controlling the application of vacuum to the neck and body molds including a shaft in part supporting the turnover unit and formed with a pair of vacuum conduits therein connected to the mold cavities, a main vacuum chamber, pipes connecting said conduits and the vacuum chamber, and cam actuated vacuum valves individual to the pipes.

3. The method which consists in separating a solid mold charge of molten glass from a supply body, dropping the mold charge into a combined primary and finishing mold having a cavity corresponding identically in contour and dimensions to the exterior surface of a hollow glass container to be produced therein, finally shaping the wall defining the filling and discharge opening by the application of vacuum to the glass, closing the mold and thereafter expanding the glass by vacuum to complete formation of the container.

4. In combination, a combined primary and finishing mold having a cavity corresponding identically in contour and dimensions to the exterior surface of a hollow glass container to be produced therein, said mold having an upwardly facing charging opening, a neck mold and plunger at the end opposite said charging opening, means for dropping a solid mold charge of molten glass into the mold by way of said charging opening and thereby partly forming the neck end of the container, means for applying vacuum to the neck mold to thereby complete formation of said neck end, a mold bottom plate adapted to close said opening after the charging and neck forming operations, means for moving the plate into operative position and means for applying vacuum to the combined primary and finishing mold for completing formation of the container.

LEONARD D. SOUBIER.